US009193534B2

(12) United States Patent
Gehring et al.

(10) Patent No.: US 9,193,534 B2
(45) Date of Patent: Nov. 24, 2015

(54) DETECTION SYSTEM FOR INSTALLATION AT A CONVEYOR BELT

(71) Applicant: SICK AG, Waldkirch (DE)

(72) Inventors: Roland Gehring, Waldkirch (DE); Jurgen Reichenbach, Waldkirch (DE)

(73) Assignee: SICK AG, Waldkirch (DE)

( * ) Notice: Subject to any disclaimer, the term of this patent is extended or adjusted under 35 U.S.C. 154(b) by 195 days.

(21) Appl. No.: 13/934,894

(22) Filed: Jul. 3, 2013

(65) Prior Publication Data

US 2014/0034456 A1  Feb. 6, 2014

(51) Int. Cl.
*B65G 43/08* (2006.01)
*G06K 7/10* (2006.01)
*G06F 17/30* (2006.01)

(52) U.S. Cl.
CPC ............... *B65G 43/08* (2013.01); *G06F 17/30* (2013.01); *G06K 7/10722* (2013.01); *G06K 7/10792* (2013.01); *G06K 7/10861* (2013.01)

(58) Field of Classification Search
CPC . G06F 17/30; G06F 7/10722; G06F 7/10792; G06F 7/10861; B65G 43/08
See application file for complete search history.

(56) References Cited

U.S. PATENT DOCUMENTS

| | | | | |
|---|---|---|---|---|
| 6,401,936 | B1 * | 6/2002 | Isaacs et al. | 209/656 |
| 6,471,044 | B1 * | 10/2002 | Isaacs et al. | 198/809 |
| 6,641,042 | B1 * | 11/2003 | Pierenkemper et al. | 235/462.01 |
| 7,721,964 | B2 * | 5/2010 | Reichenbach et al. | 235/454 |
| 2009/0039157 | A1 * | 2/2009 | Reichenbach et al. | 235/436 |
| 2009/0095600 | A1 * | 4/2009 | Reichenbach et al. | 198/810.01 |
| 2010/0012464 | A1 * | 1/2010 | Schiesser et al. | 198/460.1 |

FOREIGN PATENT DOCUMENTS

EP    1 363 228 B1    3/2006
EP    2 048 596 A1    4/2009

OTHER PUBLICATIONS

European Search Report in the Counterpart patent Application No. 12178680.0, four pages.

* cited by examiner

*Primary Examiner* — Mark A Deuble
(74) *Attorney, Agent, or Firm* — Nath, Goldberg & Meyer; Jerald L. Meyer; Stanley N. Protigal

(57) ABSTRACT

A detection system (10) is provided for installation at a conveyor belt (12) having at least one detection sensor (24, 26) for detecting object properties of objects (14) conveyed on the conveyor belt (14) and having an evaluation unit (36) for outputting object information derived from the object properties at a definable output point (34) of the conveyor belt (12). In this respect, the evaluation unit (36) is configured to divide the objects (14) into at least two object classes based on the object properties and an output point (34) can be defined for each object class at the conveyor belt (12).

20 Claims, 3 Drawing Sheets

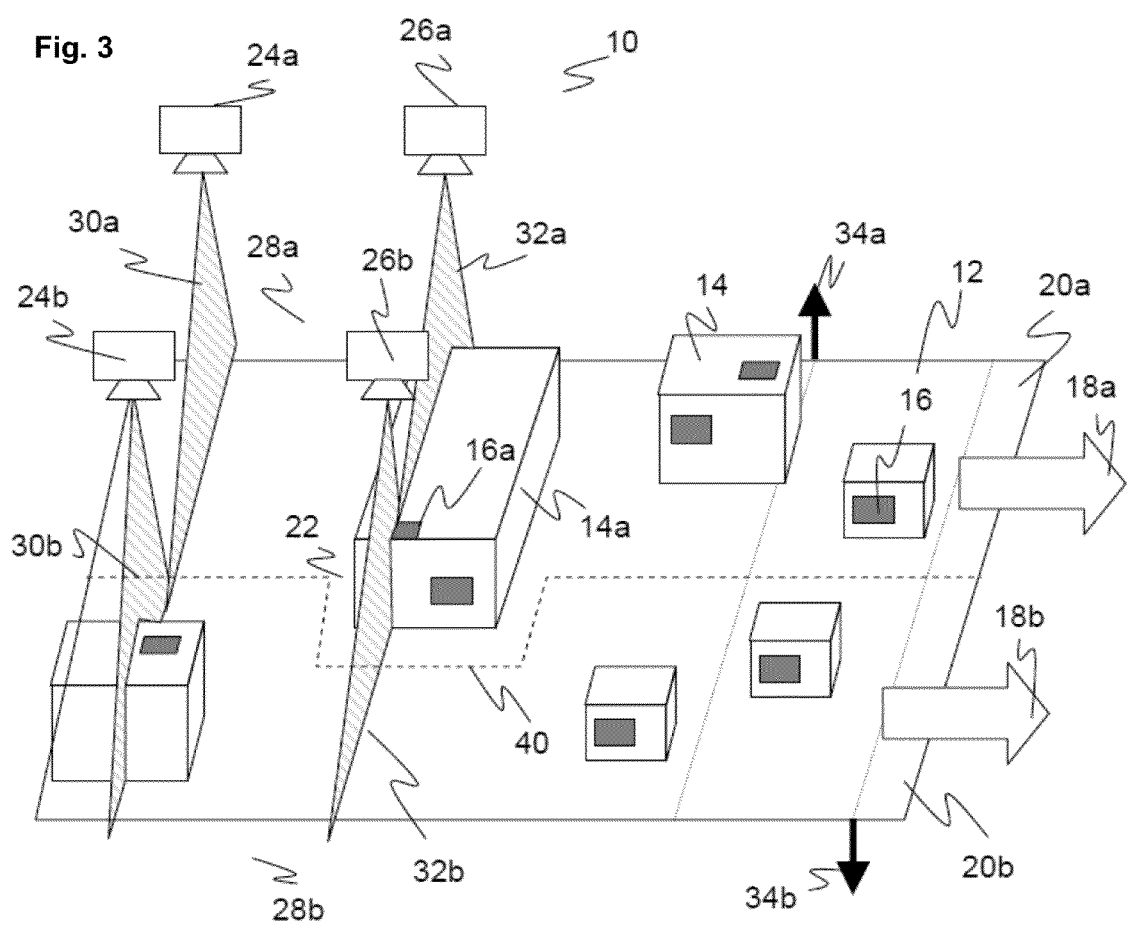

DETECTION SYSTEM FOR INSTALLATION AT A CONVEYOR BELT

Figure 1:
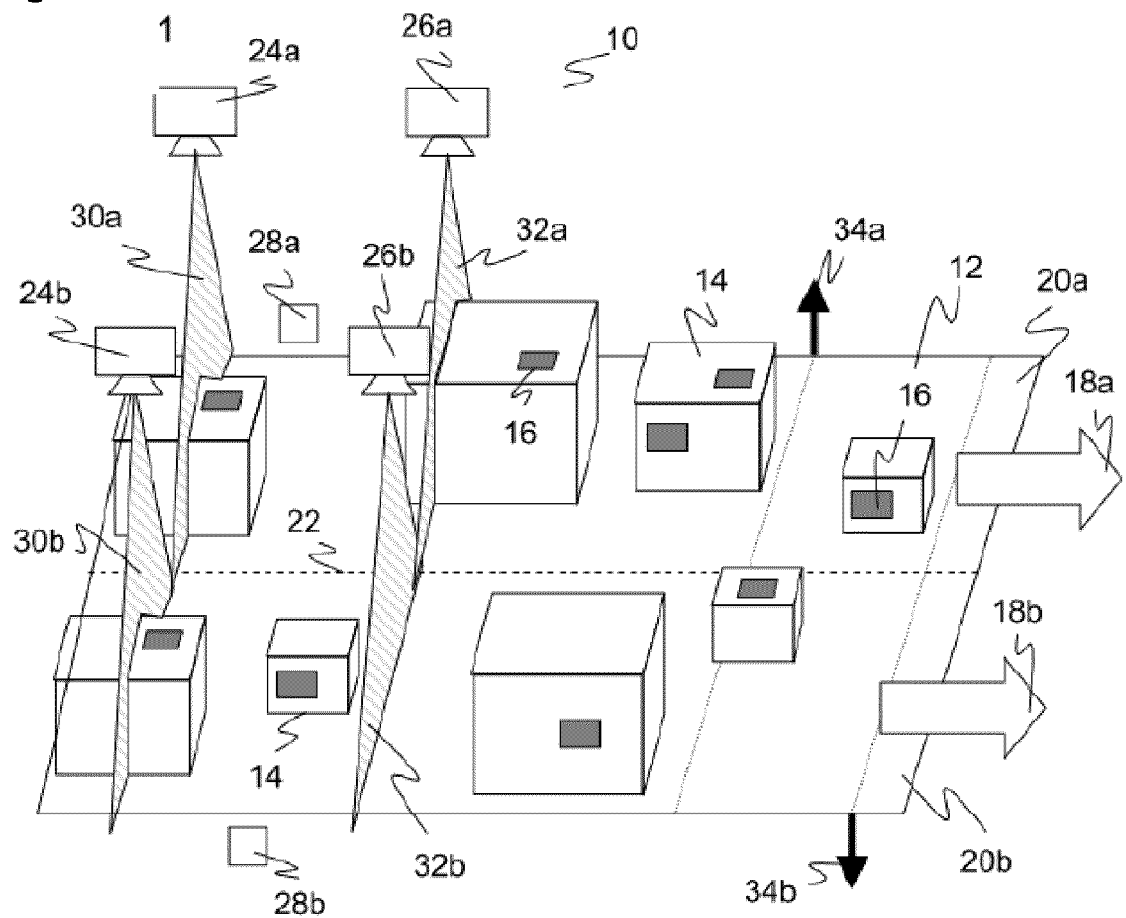

The present disclosure relates to a detection system for installation at a conveyor belt and to a method of detecting object properties using detection sensors.

Sensors are used for the automation of processes at a conveyor belt to detect object properties of the conveyed objects and to initiate further processing steps in dependence thereon. Such processing steps comprise, for example, the further processing adapted to the specific object at a machine which acts on conveyed objects or a change to the object stream in that specific objects are expelled from the object stream within the framework of a quality control or the object stream is sorted into a plurality of part object streams.

The application of a barcode or of a two-dimensional code can be considered such an object property which is separately applied to the object to give the objects individual distinctive features and thereby to facilitate such work. With objects bearing such a code, object properties can therefore be detected both by general sensors, for instance by the determination of geometrical object properties, and by code readers which read out the codes.

The most widespread code readers are barcode scanners which scan a barcode or line code using a laser reading beam transverse to the code.

They are used, for example, at supermarket check-outs, for automatic package identification, for sorting postal shipments or in baggage handling at airports and in other logistics applications. Barcode scanners are increasingly being replaced by camera-based code readers with the further development of digital camera technology. Instead of scanning code regions, a camera-based code reader takes images of the objects having the codes located thereon with the aid of a CCD chip and image evaluation software extracts the code information from these images. Camera-based code readers also cope without problem with different code types than one-dimensional barcodes which also have a two-dimensional structure like a matrix code and provide more information. In an important application group, the objects bearing the code are conveyed past the code reader. A camera, frequently a camera array, reads the object images having the code information successively with the relative movement.

One type of code reader which is based on a completely different technology is an RFID (radio frequency identification) reader. In this respect, a transponder is applied to the object to be identifies instead of an optical code. The purpose remains the same, namely to enable a recognition of objects for an individualized treatment.

The detection zone of an individual sensor is often not sufficient to read all relevant information on the objects on a conveying belt. Particularly on code reading, a plurality of sensors are as a rule provided to take images of objects from a plurality of sides or from all sides so that the codes can be applied to any desired sides of the objects. The individual sensors are combined into a detection system in which a common control usually prepares the different sensor data before they are transmitted to a master control of the plant to which the conveyor belt belongs.

It is furthermore known to arrange an additional geometry sensor, for instance a distance-measuring laser scanner, in front of code readers. In this manner, information is obtained in advance as to which objects are located on the conveyor belt and which geometry these objects have. On the other hand, the position of a code is determined during the reading. It is thus unambiguously possible to associate the code, and thus its code information, with an object.

The position of a code can be measured in a barcode scanner by an integrated distance determination. Three-dimensional polar coordinates of the code position are namely then available via the scanning angle, the angle of the scan plane and the distance. Alternatively, a distance is not measured, but rather the point of intersection of the reading beam with the known object geometry is determined. A camera-based code reader recognizes the code position by image processing and by possible corrections by offsetting with the object geometry. Localization processes using the signal strength of the RFID signal or using phase measurements are known for RFID readers, with currently, however, all problems not being mastered in the prior art in order always to obtain a reliable and unambiguous transponder position.

Object properties and code information are determined at different conveying positions on use of an additional geometry sensor and the output of the processed object properties for the control of the further objet flow, such as code information, weight or geometry of the object, takes place at an output point displaced again in the conveying direction. To obtain the association with an object during the conveying movement, the object is tracked on the basis of the measured or known conveying speed or on the basis of a path signal of an encoder attached to the conveyor belt.

This object tracking, however, conventionally opens into only one output point. The master control therefore always obtains the object information when an object is located at one and the same position of the conveyor belt. It is thus not possible to differentiate between the objects in this regard.

This problem arises to a particular degree when a plurality of conveyor belts are arranged next to one another. This is of advantage for increasing the object throughput. A similar effect is achieved in that the conveyor belt is designed with twice the width, for example, and in that a plurality of objects are conveyed next to one another. This practically corresponds to a plurality of conveyor lines having the same speed among one another.

A conventional detection system cannot cope with this situation because the single output point can only be tailored to the requirements of one conveyor belt and is therefore at best suitable for the further conveyor belts by changes or by adaptations of the total plant. The master control also has no knowledge at all of which of the plurality of conveyor belts the object currently passing the output point is located on. It is therefore necessary in accordance with the present prior art to install separately working detection systems on each of the conveyor belts. Information from overlaps of a detection zone with an adjacent conveyor belt not only remains unused, but it must even be masked by a corresponding mechanical arrangement or by software algorithms. The cost expense is thereby substantially increased.

EP 1 363 228 B1 describes a code reader having an integrated distance determination which is configured for determining code positions or for associating codes with objects. The code readers are barcode scanners and therefore read pair-wise in a cross arrangement so that the reading line of at least one of the code readers always sweeps over the total barcode once in the transverse direction. An additional sensor is attached above the barcode scanners against the conveying direction in an embodiment, said additional scanner measuring the geometry of the incoming objects, and indeed also when a plurality of objects lie next to one another on the conveyor belt. However, no special treatment of object lying next to one another subsequently takes place over objects disposed behind one another. The read codes are associated with the objects on leaving the reading zone. No information is determined or even output as to which objects lie in which arrangement next to one another. It is also not described that information behind the reading zone is output to a master control so that there is no indication to deviate from the usual forwarding of information to a single output point. The conveyor belt is only treated as a single conveyor line, and indeed also for objects disposed next to one another.

It is therefore the object of the disclosed technology to provide a detection system which can process objects on a conveyor belt more flexibly.

This object is satisfied by a detection system for installing at a conveyor belt and by a method of detecting object properties by using at least one detection sensor for detecting object properties of objects conveyed on the conveyor belt, and an evaluation unit for outputting object information derived from the object properties at a definable output point of the conveyor belt. The evaluation unit divides the objects into at least two object classes based on the object properties, and an output point can be defined for each object class at the conveyor belt. In this respect, the disclosed technique starts from the basic idea of considering the total object stream on the conveyor belt as a combination of a plurality of part streams of a respective object class which are defined by specific object properties. The object classes can then be treated in different manners. An output point for each object class can be defined and configured at the conveyor belt. Accordingly, the object information is preferably output at just that point in time to a master control, for example, at which the object in question reaches the output point. Alternatively, the object information is transmitted asynchronously and contains time information on when the object is located at the output point. The coordinated time behavior in the detection system is then made more difficult, however, and unexpected fluctuations of the conveying movement can have the result that the time information is no longer correct.

The output points for each object class are preferably set differently to carry out different processing stapes at the objects. In some applications, however, it is also conceivable to allow the output points of a plurality of all object classes to coincide. The master control then also knows the associated object class due to the transferred object information.

The object information can comprise every kind of detected object properties or information derived therefrom or, in the minimal case, can only comprise a binary signal which by its transmission to the output point implicitly communicates that an object of a specific object class is currently passing the output point. The master control decides whether a handling is initiated, for instance the expulsion of the respective object and the extent to which the object information influences this decision.

The disclosed technology has the advantage that the detection system provides additional processing possibilities. Objects no longer have to be further processed uniformly at the same output point. The application spectrum thereby expands or applications can be satisfied with fewer sensor installations.

At least one detection sensor is preferably configured as a code reader, in particular as a camera-based code reader, barcode scanner or RFID reader. The read code information can be part of the object properties which flow into the classification into an object class and also part of the output object information. A camera-based code reader has a linear or matrix-shaped image sensor with which an image is composed during the relative movement of the object on the conveyor belt or is taken in a snapshot manner.

The position of a read code can preferably be determined in the code reader, with the evaluation unit being configured to associate the code with an object based on the position of said code. The code information becomes an object property due to the association. The determined code position is tracked according to its advance after the detection on the conveyor belt. In a camera-based code reader, the position determination preferably takes place by image processing. A barcode scanner utilizes, as described above, an integrated distance determination or determines the point of incidence of the reading beam based on known geometry properties of the code-bearing object. Localization processes for the transponder are known for RFID readers based on signal strengths or phases of the RFID signals and are being continuously improved.

At least one detection sensor is preferably configured as a geometry detection sensor. Objects on the conveyor belt are thus recognized together with their dimensions. If the detection system comprises both code readers and geometry detection sensors, there are different configurations. The geometry detection sensor can be configured separately and is then preferably arranged in front of the code reader so that the geometry data can already be used by the code reader, for instance for focusing. It is, however, also possible to combine the geometry detection and the code reading in one sensor. An integrated distance measurement by time of flight of light measurement can serve for this purpose with barcode scanners. Camera-based code readers can be configured as 3D cameras and measure geometries via a stereoscopic process, a time of flight of light process or a light sectioning process, for instance by means of deformations of an illumination line by the object contours.

The detection system preferably has at least one speed sensor for determining the conveying speed of the conveyor belt or has at least one path sensor for determining the advance of the conveyor belt. The output point lies at a definable position on the conveyor belt behind the location of the detection. The time at which an object was conveyed up to the output point can be recognized via the advance measured by a speed sensor or path sensor. Alternatively to a measurement of the advance, a movement profile of the conveyor belt can be predefined or can be communicated by a master control. Provided that the conveyor belt comprises, as described further below, a plurality of conveyor lines having different conveyor speeds, the attachment of a plurality of speed sensors or path sensors is also conceivable.

The object properties preferably include at least one of the following properties: a width, a height, a length, a volume, a surface area, a contact surface of the object or of a body bounding the object, a remission property or a weight. The most frequently required object geometry properties are thus covered. The contact surface does not necessarily refer to the surface with actual contact between the conveyor belt and the object. A perpendicular projection of the object contour onto the conveyor belt describes the space taken up in some situations. Remission properties can be detected abstractly as a quantification of a strong or weak remission or in more concrete terms as gray values or colors. Two particularly important properties for the billing and transport planning in logistics are covered by the weight and volume.

The detection system preferably has a plurality of detection sensors whose detection zones complement one another in the width direction of the conveyor belt. Conveyor belts with a large width are thus also covered which exceed the maximum field of view of an individual detection sensor. This combination of a plurality of detection sensors is possible for both geometry detections sensors and for code readers. The evaluation unit is preferably configured to fuse the object properties of the detection sensors. In this respect, for example, image data are put together (stitched) or the detected object properties and code information are combined as if they were determined by a single detection sensor which detects the full width of the conveyor belt.

The evaluation unit is preferably configured to convert object properties detected by a plurality of detection sensors into a common coordinate system. This is an important example for data fusion from a plurality of detection sensors. The requirement for a conversion into a common coordinate system is the knowledge of the mutual position and orientation of the detection sensors which can be determined in a calibration called a registration.

The evaluation unit is preferably configured to divide objects based on their position on the conveyor belt in the transverse direction into at least two object classes, in particular based on at least one dividing line along the conveyor belt. The conveyor belt is thus divided into multiple conveyor lines (multiline). The dividing line between the conveyor lines does not necessarily have to be drawn straight in the longitudinal direction, but can rather have an indentation, for example, to associate a larger object with a conveyor line. Additional divisions into further object classes based on other object properties are possible within a conveyor line. The different object classes can also be considered different conveyor lines which are then superimposed on one another spatially so-to-say and are differentiated by different object properties in embodiments in which the object position in the transverse direction or the lateral object position is not a property forming object classes. A single detections system is sufficient due to the distinction based on the position on the conveyor belt in the transverse direction so that the costs are reduced. The design of the detection system is independent of the number of conveyor lines as long as the detection sensors can together cover the conveyor belt width. In this respect, a direct association of a respective one detection sensor with a conveyor line is possible, but by no means absolutely necessary.

The objects are tracked in the different tracks or conveyor lines and are output at the respective output point belonging to an object class. Objects of each conveyor line can thus, for example, be expelled at a different position. The output points of two conveyor lines can also be at the same level. For the master control is nevertheless aware at the output point, due to the association with an object class, of the conveyor line on which a currently passing object is located and can adapt the processing step thereto, for example in that objects on a right hand conveyor line are expelled to the right and objects on a left hand conveyor line are expelled to the left.

The evaluation unit is preferably configured to display a dividing line dynamically. This displacement can take place over the total length of the dividing line to divide the conveyor belt again. A displacement in only one part zone is, however, also conceivable to provide or to resolve an indentation for a larger object. The displacement of the dividing line is possible automatically and manually.

The dividing line is preferably an actual dividing line between a plurality of conveyor lines of the conveyor belt. In this embodiment, a plurality of conveyor belts which are adjacent, but which are physically separate, should be detected by the same detection system. In this respect, under certain circumstances, different speeds of the individual conveyor belts are to be processed. Alternatively, the dividing line can also be a virtual dividing line which divides a single conveyor belt. In this respect, it can also be one of the plurality of adjacent conveyor belts, with then both actual and virtual dividing lines being drawn.

The evaluation unit is preferably configured to vary the number of dividing lines considered. In this respect, dividing lines are added or removed, for instance because a new load of objects is to be processed. For example, small objects can lie next to one another in threes or fours in one load, whereas in an adjacent load only large objects are present which take up the whole width and therefore make a dividing line superfluous. Virtual dividing lines can be deleted or added freely. Actual dividing lines between adjacent conveyor belts separate from one another are naturally maintained, but the detection system can decide whether it takes account of or treats this physical separation as a dividing line or not.

The evaluation unit is preferably configured to determine the association based on the position in the transverse direction by the center of gravity of the object or the largest portion of the contact surface of the object. In the simplest case, the total object contour is located within one and the same conveyor line. If this is, however, not satisfied, a criterion has to be found as to which conveyor line the object should belong to. The contact surface can, as further above, also be defined by a perpendicular projection of the three-dimensional object contour onto the conveyor belt. The center of gravity and the contact surface can be related both to the object contour and to a bounding box, for instance a bounding rectangle or parallelepiped. Finally, the association can also take place manually, either from the start or only in individual cases for monitoring or postprocessing in critical cases.

The evaluation unit is preferably configured to vary the criteria for the division of objects into object classes during the operation at a switchover time, with object information being output according to earlier criteria for so long at an output point until a zone of the conveyor belt detected at the switchover time has passed the output point. The earlier configuration then, however, temporarily remains valid for the object information already detected, but not yet output. The switchover time from the location of the detection to the output points must therefore be tracked so-to-say. This is particularly clear on a displacement of dividing lines: they are first only displaced at the location of the detection, and the new dividing line configuration is then displaced with the movement of the conveyor belt up to the output points.

The method in accordance with the invention can be further developed in a similar manner and shows similar advantages in so doing. Such advantageous features are described in an exemplary, but not exclusive manner in the subordinate claims dependent on the independent claims.

Figure 2:
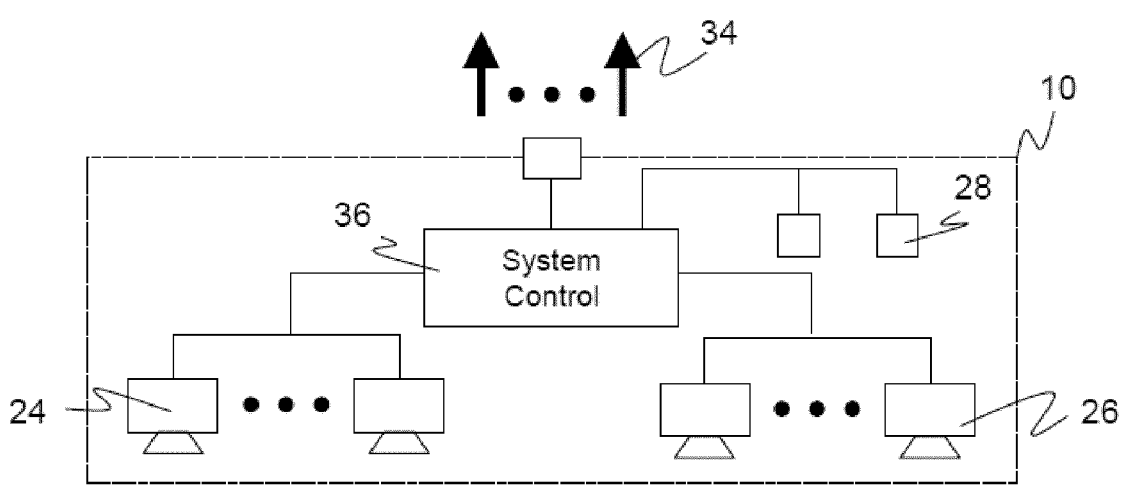

The invention will be explained in more detail in the following also with respect to further features and advantages by way of example with reference to embodiments and to the enclosed drawing. The Figures of the drawing show in:

FIG. 1 a schematic three-dimensional plan view of a detection system at a conveyor belt having objects to be detected;

FIG. 2 a simplified block diagram of a detection system; and

FIG. 3 a representation similar to FIG. 1 with a conveyor belt on which a larger object takes up more than one conveyor line.

FIG. 1 shows a schematic three-dimensional plan view of a detection system 10 at a conveyor belt 12 with objects 14 to be detected onto which codes 16 have been applied. The conveyor belt 12 is divided into two in a longitudinal direction corresponding to the arrows 18*a-b* indicating the conveying direction so that two conveyor lines 20*a-b* with a dividing line 22 therebetween are present. The conveyor belt 12 can be a conveyor belt in the narrower sense, but also another system with objects 14 moved relative to the detection system 10. The detection system 10 comprises two respective geometry detection sensors 24*a-b* to determine the object geometry of the objects 14, two code readers 20*a-b* to read out code information of the codes 16 and two encoders 28a-b to determine the advance of the two conveyor lines 20a-b of the conveyor belt 12.

The detection zone 30a-b of an individual geometry detection sensor 24a-b is preferably as large as the width of a conveyor line 20a-b or somewhat larger so that the two geometry detection sensors 24a-b determine geometry data of objects 14 over the full width of the conveyor belt 12.

This does not, however, necessarily have to be the case as long as substantial portions of the conveyor belt 12, for example a large part of a seam point, is detected. The detection zones 32a-b of the code readers 26a-b are also correspondingly designed. Geometry data and code information of all objects 14 and codes 16 are therefore available to the detection system 10 independent of the position on the conveyor belt 12. Corresponding object information is output in a manner explained further below at output points 34a-b beneath the detection system 10 in the conveying direction to a master control, for example, to initiate further processing steps at the objects 14, for instance a sorting based on the object information. As described in the introduction, further sensors, not shown, can be attached from another perspective to detect geometries or codes from the side or from below.

FIG. 2 shows the detection system 10 again in a simplified block diagram. In this respect, the same reference numerals designate the same or mutually corresponding features in the whole description. The geometry detection sensors 24, code readers 26 and encoders 28 are connected to a control and evaluation unit 36 of the detection system 10. The different detected pieces of information are collected and processed there and corresponding object information is output via an output 38 at the output points 34 to the master control.

The control and evaluation unit 36 converts the sensor data into a common coordinate system. A common three-dimensional contour of the objects 14 thus arises on the conveyor belt 12 by addition of the detection zones 30a-b of the geometry detection sensors 24a-b in the width and successively in the course of the conveying movement in the length and individual objects are identified and their geometrical properties, such as position, dimensions, volume, are determined from said three-dimensional contour. The three-dimensional contour can subsequently be simplified, for instance by three-dimensional application of a tolerance field or bounding of the objects 14 by simple bodies such as parallelepipeds (bounding box). Suitable geometry detection sensors, for example distance-measuring laser scanner, light-section sensors or 3D cameras, are known per se and are therefore not explained in any more detail. They can in another respect determine remission properties additionally or even instead, at least in some embodiments and despite their main task of detecting geometrical properties.

Code information of the codes 16 are read out everywhere on the conveyor belt by a corresponding addition of the detection zones 32a-b of the code readers 26a-b. In this respect, a code position is also simultaneously determined. The procedure here depends on the type of the code reader 26a-b. With a code scanner, the code positions are determined from the direction of the reading beam with the aid of an integrated distance determination of the code readers 26a-b or by intersection with the three-dimensional contour of the geometry detection sensors 24a-b. With a camera-based code reader 26a-b, the image is evaluated to localize the code 16, optionally with an offsetting with the three-dimensional contour. An RFID reader can localize the code 16 configured as a transponder in this case on the basis of signal strengths or phases.

Since the control and evaluation unit 36 is thus aware of both the position of the objects 14 and of the codes 16, the codes 16 can be respectively associated with an object 14, whereby the read out code information is made into object information. It must be noted in this respect that the detections and the output of object information takes place at different positions at the conveyor belt 12. For this reason, the objects 14 are tracked on the conveyor belt 12, with the encoders 28a-b delivering the information required for this purpose via the movement or the advance of the conveyor belt 12.

The control and evaluation unit 36 is in this respect able to track the objects 14 separately on the plurality of conveyor belts 20a-b in accordance with their different conveying speeds. The individual events such as the time of the geometry detection or the time of the code reading then separately have the matching encoder signal for the respective conveyor line 20a-b applied to combine the sensor data correctly to form object information and to know when the object 14 passes an output point 34a-b on its respective conveyor line 20a-b.

The control and evaluation unit 36 divides the object stream into a plurality of part streams based on the detected object properties, with a specific object class being associated with each part stream. A conceivable criterion for the definition of an object class is the associated with a conveyor line 20a-b, that is ultimately the lateral position on the conveyor belt 12. In order also to make an unambiguous decision on this in borderline cases, the position of the center of gravity of an object 14, for example, or the largest surface portion on a conveyor line 20a-b can be used. A manual association or postprocessing is also conceivable in critical cases.

Other criteria for the definition of an object class can be derived from geometry properties such as the length, width, height or volume of an object, from remission properties, that is from the brightness or color, or from the weight detected using an additional sensor. A part stream then arises, for example, with small objects, and another part stream arises with bright objects. The code information can also contribute and opens up practically any desired feature space. A typical example is, however, a sorting by target addresses, that is, for example, by zip code zones. It is possible, but by no means compulsory that the number of object classes corresponds to the number of conveyor lines 20a-b.

A separate output point 34a-b can now be configured for each part stream and thus for each object class defining the part stream. Higher, larger or heavier objects 14 are, for example, thereby expelled at another position along the conveyor belt 12 than flat, small or light objects 14. The objects on different conveyor liens 28a-b are in particular treated differently by separate output points 34a-b. It is not precluded in this respect that a plurality of output points 34a-b are configured to the same position. Despite this agreement, the different object classes are namely known at the moment of the transfer of the object information to the master control. There is therefore furthermore the possibility of treating the part streams individually in order, for instance, to expel objects 14 conveyed on a left hand conveyor line 20a in a different direction than objects 14 conveyed on a right hand conveyor line 20b.

FIGS. 1 and 2 show an example with a configuration divided into two in every respect. The invention is, however, not restricted to this. First, in an analog manner, objects 14 can be processed by further sensors 24, 26, 28 on conveyor belts 12 with additional conveyor lines 20 with a plurality of conveying speeds. Conversely, however, it is also possible that the conveyor belt 12 is a uniform conveyor belt 12 of larger width. In this respect, one encoder 28 is naturally sufficient to detect the conveying movement. The plurality of conveyor lines 20a-b are then so-to-say virtual and the dividing line 22 is no longer physically predefined, but rather freely configurable. It is also possible in this case to dispense fully with a dividing line 22 and thus not to make the lateral position of an object 14 a criterion for the association with an object class. In a certain sense, even more conveyor lines 20a-b still exist which are, however, not spatially separate, but practically folded in on themselves and define themselves by other object properties than the lateral position.

The numbers of the geometry sensors 24, code readers 26, conveyor lines 20 and output points 34 do not have to correspond to one another. For example, the detection zone 30 of a single geometry detection sensor 24 can be sufficient to cover the total width of the conveyor belt 12, while narrower detection zones 32a-b of a plurality of code readers 26 have to be added for this purpose, or vice versa. It is not necessary in this respect that a detection zone 32a-b corresponds to just one conveyor line 20a-b, although this facilitates the configuration, maintenance and overview since the detected object information is anyway fused in the control and evaluation unit 36 and is therefore independent of the actual number of detection sensors 24, 26. The number of output points 34 is therefore not necessarily based on the number of conveyor lines 20a-b because virtual conveyor lines 20a-b may be present and because other object properties can also be taken into account in the formation of object classes in addition to the lateral position of objects 14.

The code readers 26 are in this connection considered as detection sensors for a special type of object information, namely the code content. Depending on which object properties one is interested in, the code readers 26, or conversely the geometry detection sensors 28, can therefore also be dispensed with in some embodiments. In another variant, the geometry detection and the code reading are combined in a respective one sensor such as with a distance-measuring code scanner or a 3D camera-based code reader.

As already explained, the dividing line 22 does not necessarily lie between two physically separate conveyor lines 20a-b of different conveying speed. This opens up the possibility of adding, removing or dynamically varying virtual dividing lines 22 to process different object streams, for example on a load change. In this respect, the switchover of the configuration can take place dynamically in ongoing operation. Such a switchover can relate equally to the position of dividing lines 22 as to other object properties which form the definition for object classes. On a switchover in ongoing operation, the switchover time is tracked with the aid of the encoder information up to the output points 34 so that objects 14 between detection and output at the moment of the switchover are treated correctly. Conveyor lines 20a-b formed by virtual dividing lines 22 are in particular still valid for so long until the switchover time has reached the associated output point 34a-b.

FIG. 3 illustrates another form of dynamic adaptation of virtual dividing lines 22. In contrast to FIG. 1, in which the objects 14 are always clearly located on one of the two conveyor liens 20a-b, here a large object 14a is conveyed on a conveyor line 20a which hangs over in the zone of the other conveyor line 20b so that its code 10a is read on the adjacent conveyor line 20b. The control and evaluation unit 26 compensates this in that the dividing line 22 is temporarily displaced and an indentation is formed to associate the total large object 14a with a conveyor line 20a.

The invention claimed is:

1. A detection system (10) for installation at a conveyor belt (12) comprising:
at least one detection sensor (24, 26) for detecting object properties of objects (14) conveyed on the conveyor belt (12), the object properties including the objects' (14) position on the conveyor belt (12) in the transverse direction; and
an evaluation unit (36) for outputting object information derived from the object properties at a definable output point (34) of the conveyor belt (12),
wherein the evaluation unit (36) is configured to divide the objects (14) into at least two object classes based on their position on the conveyor belt (12) in the transverse direction,
and wherein an output point (34) can be defined for each object class at the conveyor belt (12).

2. The detection system (10) in accordance with claim 1, wherein at least one detection sensor (26) is configured as a code reader, a barcode scanner or an RFID reader.

3. The detection system (10) in accordance with claim 2, wherein the code reader is configured as a camera-based code reader.

4. The detection system (10) in accordance with claim 2, wherein the position of a read code (16) can be determined in the code reader (26); and wherein the evaluation unit (36) is configured to associate the code with an object (14) with reference to the position of said code.

5. The detection system (10) in accordance with claim 1, wherein at least one detection sensor (24) is configured as a geometry detection sensor.

6. The detection system (10) in accordance with claim 1, further comprising at least one speed sensor (28) for determining the conveying speed of the conveyor belt (12) or further comprising at least one path sensor (28) for determining the advance of the conveyor belt (12).

7. The detection system (10) in accordance with claim 1, wherein the object properties comprise at least one of the following properties selected from the group of members comprising:
a width, a height, a length, a volume, a surface area of a contact surface of the object (14) or of a body bounding the object, a remission property and a weight.

8. The detection system in accordance with claim 1, wherein the evaluation unit (36) is configured to divide objects (14) into at least two object classes based on their position on the conveyor belt (12) in the transverse direction based on at least one dividing line (22) along the conveyor belt (12).

9. The detection system (10) in accordance with claim 8, wherein the evaluation unit (36) is configured to displace a dividing line (22) dynamically.

10. The detection system (10) in accordance with claim 8, wherein the dividing line (22) is an actual dividing line between a plurality of conveyor lines (20a-b) of the conveyor belt (12).

11. The detection system (10) in accordance with claim 8, wherein the evaluation unit (36) is configured to vary the number of dividing lines (22) taken into account.

12. The detection system (10) in accordance with claim 1, wherein the evaluation unit (36) is configured to determine the association based on the position in the transverse direction by the center of gravity of the object (14) or the largest portion of the contact surface of the object (14).

13. The detection system (10) in accordance with claim 1, wherein the evaluation unit (36) is configured to vary the criteria for the division of objects (14) into object classes during the operation at a switchover time, with object information being output according to the earlier criteria for so long at an output point (34) until a zone of the conveyor belt (12) detected at the switchover time has passed the output point (34).

14. A method of detecting object properties of objects (14) conveyed on a conveyor belt (12) having at least one detection sensor (24, 26), comprising:

using an evaluation unit (36) to divide objects (14) into at least two object classes based on their position on the conveyor belt (12) in the transverse direction wherein object information derived from the object properties is output at a predefinable output point (34) of the conveyor belt (12), and wherein the objects (14) are divided into at least two object classes based on the object properties; and wherein a respective output point (34) is defined for each object class at the conveyor belt (12).

15. A method of detecting object properties of objects (14) conveyed on a conveyor belt (12) having at least one detection sensor (24, 26), comprising:

using a plurality of detection sensors (24*a-b*, 26*a-b*) whose detection zones (30*a-b*, 32*a-b*) complement one another in the width direction of the conveyor belt (12); and using an evaluation unit (36) to fuse the object properties of the detection sensors (24*a-b*, 26*a-b*), wherein object information derived from the object properties is output at a predefinable output point (34) of the conveyor belt (12), and wherein the objects (14) are divided into at least two object classes based on the object properties; and wherein a respective output point (34) is defined for each object class at the conveyor belt (12).

16. A detection system (10) for installation at a conveyor belt (12) comprising:

at least one detection sensor (24, 26) for detecting object properties of objects (14) conveyed on the conveyor belt (12); and an evaluation unit (36) for outputting object information derived from the object properties at a definable output point (34) of the conveyor belt (12);

a plurality of detection sensors (24a-b, 26a-b) whose detection zones (30*a-b*, 32*a-b*) complement one another in the width direction of the conveyor belt (12), wherein the evaluation unit (36) is configured to fuse the object properties of the detection sensors (24*a-b*, 26*a-b*), wherein the evaluation unit (36) is configured to divide the objects (14) into at least two object classes based on the object properties, and wherein an output point (34) can be defined for each object class at the conveyor belt (12).

17. The detection system (10) in accordance with claim 16, wherein the evaluation unit (36) is configured to convert object properties detected by a plurality of detection sensors (24*a-b*, 26*a-b*) into a common coordinate system.

18. The detection system (10) in accordance with claim 16, wherein the evaluation unit (36) is configured to divide objects (14) into at least two object classes based on their position on the conveyor belt (12) in the transverse direction.

19. The detection system (10) in accordance with claim 16, wherein the position of a read code (16) can be determined in the code reader (26); and wherein the evaluation unit (36) is configured to associate the code with an object (14) with reference to the position of said code.

20. The detection system in accordance with claim 16, wherein the evaluation unit (36) is configured to divide objects (14) into at least two object classes based on their position on the conveyor belt (12) in the transverse direction based on at least one dividing line (22) along the conveyor belt (12).

* * * * *